May 17, 1932.  G. M. BELLANCA  1,858,726

AIRPLANE ENGINE ARRANGEMENT

Original Filed June 7, 1930

Inventor
GIUSEPPE M. BELLANCA

By Semmes & Semmes
Attorneys

Patented May 17, 1932

1,858,726

UNITED STATES PATENT OFFICE

GIUSEPPE M. BELLANCA, OF NEW CASTLE, DELAWARE

AIRPLANE ENGINE ARRANGEMENT

Application filed June 7, 1930, Serial No. 459,745. Renewed March 19, 1932.

This invention relates in general to airplanes and more particularly has reference to an improved arrangement for airplane motors.

Heretofore it has been customary to provide airplanes with one or more engines, each being connected with a propeller for driving the airplane. Because of the likelihood of any single engine becoming disabled during flight, an airplane in which the power is furnished by a plurality of independent units is obviously highly desirable.

Up to this time, multi-motored airplanes have been constructed with their respective power plants arranged in a number of different ways. Probably the most common of these has been the tri-motored type of plane carrying one motor on the nose of the fuselage and a motor on each wing at equal distances from the fuselage. Another type has been the bi-motored type of plane having one motor positioned on each wing at equal distances from the fuselage. Yet another type has been the multi-motored plane. In this type the motors are grouped in pairs on the wings, there being an even number of pairs, so that the plane will be balanced. The respective pairs are arranged in tandem so that in each pair, one motor operates a pushing and the other a pulling or tractor propeller.

It is noted that each of the above-mentioned types of motor arrangement has at least a part of the power equipment mounted upon the wings at a substantial distance from the center of gravity and from the longitudinal center of the airplane. In practice it has been discovered that, upon the failure of any single one of the power units so mounted on the wing, the airplane is thrown far off its balance. This feature, as it will readily be seen, is very likely to cause serious accidents.

It is also noted that when the engines are mounted on the wings there arises the necessity for relatively heavy framing to support them, thus substantially increasing the weight of the plane. Furthermore, this framing as well as the motors themselves, substantially increases the total air resistance of the airplane.

It is apparent that any arrangement of a plurality of motors in an airplane in such a manner as to avoid the above-mentioned difficulties would be highly desirable.

To overcome the above and other disadvantages in the prior arrangements of airplane motors is one of the objects of this invention.

Another object of this invention is to provide an arrangement of motors in an airplane in which the failure of one motor will not greatly unbalance the airplane.

Yet another object of this invention is to provide an arrangement of the motors in an airplane in which the application of force due to the action of any one of the motors is not far removed from the central plane of the airplane.

Yet another object of this invention is to provide an arrangement of motors in an airplane in which the motors are not exposed to and do not interfere with the air stream.

Another object of the present invention is to provide an arrangement of motors in an airplane in which it is not necessary to have superfluous frame members for motor supports.

With the above and other important objects in view this invention comprehends an arrangement of a number of motors in an airplane in such a manner that none of the motors will be exposed to the air stream and the entire group of motors will be concentrated in one relatively small part of the plane.

To assist in a full understanding of this invention, and wishing it to be clearly understoood that various changes and modifications may be made in the embodiment herein disclosed by way of example without departing from the spirit or scope of this invention, reference is made to the accompanying drawings in which similar numerals indicate correspond parts.

Figure 1:
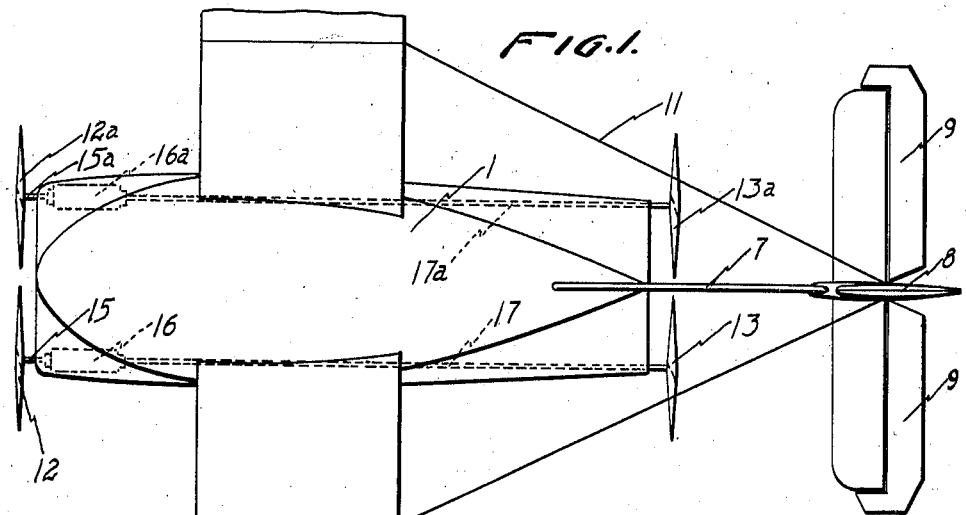
Figure 1 is a partial diagrammatic plan view of an airplane of the monoplane type embodying my improved arrangement of motors.
Figure 2:
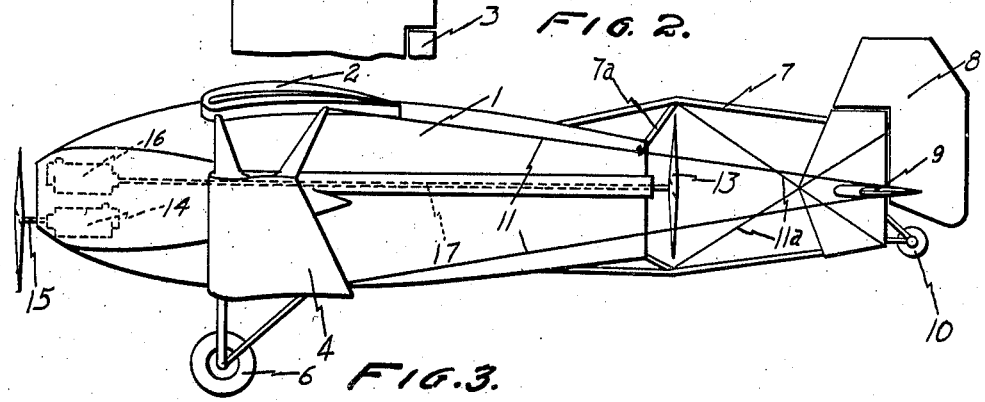
Figure 2 is a side view of the airplane shown in Figure 1.
Figure 3:
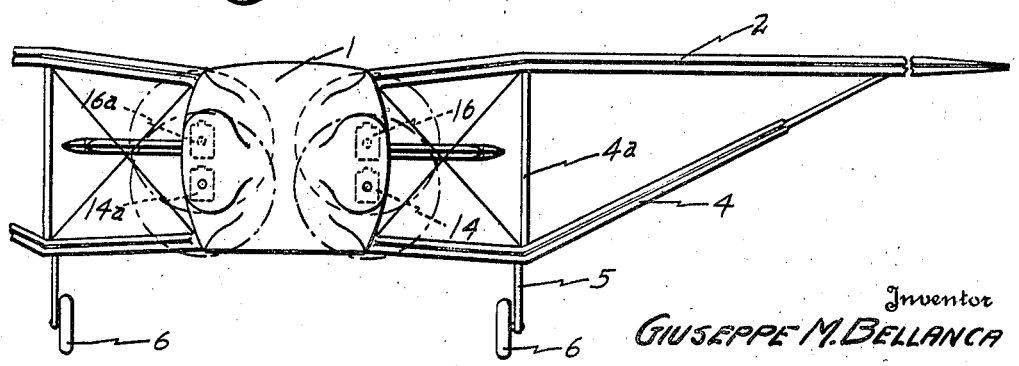
Figure 3 is a front view of the airplane shown in Figure 1.

Referring now more particularly to the drawings there is shown in outline an airplane of the monoplane type having a fuselage 1 and a wing 2. This wing is provided at its trailing edge with the usual ailerons 3 and is further provided with brace members 4 extending from its lower surface to the lower portion of the fuselage. These brace members 4 are preferably of the type which themselves are formed to furnish a sustaining surface to assist in supporting the airplane. Attached to the lower portion of the airplane in any conventional manner but preferably by being attached to the braces 4 adjacent the fuselage are the wheel supporting structures 5 carrying the landing wheels 6.

The brace members 4 are themselves reinforced by means such as vertically arranged struts 4a extending from the brace members 4 at a point immediately above the landing wheels 6 to the lower portion of the wing 2.

To the rearmost portion of the fuselage 1 the rearwardly extending support members 7 for supporting the empennage are attached. These members 7 are reinforced by means such as the braces 7a. The empennage consists of the usual rudder 8 and elevators 9, and carries by a suitable mounting attached to its lower portion, a rear landing wheel 10. This tail structure is further braced against lateral movements by means of the tension members 11 and 11a. As is well known, this outrigger type of empennage has numerous advantages, among which are lightness and ease of control. It is also apparent that this construction enables a standardization in fuselage size and construction. As will hereinafter more fully appear, this type of construction is also well adapted to my improved arrangement of motors and propellers.

At its forward end the fuselage is provided with tractor propellers 12 and 12a and at its rearward end is provided with pusher propellers 13 and 13a for driving the airplane. Within the fuselage there are arranged the engines 14 and 14a adjacent the nose of the fuselage for the purpose of driving the tractor propellers 12 and 12a respectively through the intermediary of the propeller shafts 15 and 15a respectively. Directly above and arranged parallel to the engines 14 and 14a are other engines 16 and 16a for the purpose of driving the pusher propellers 13 and 13a through the intermediary of the shafts 17 and 17a respectively. The shafts 15 and 17 and the shafts 15a and 17a are arranged in parallel relationship to each other so that each of the propellers 12 and 13 and each of the propellers 12a and 13a will act on the airplane to drive it in the same direction. Since the engines have been arranged as close together as possible, the lines of the propeller shafts will be relatively close together, and hence the forces exerted by the various propellers on the airplane will be closely adjacent each other. The engines which are used in this arrangement may be of any well known type such as gasoline or Diesel and may be water-cooled.

It will be seen that there has been provided an arrangement of a plurality of motors in an airplane whereby in event of the failure of one of the motors, the others would continue to propel the plane in the same direction, and because of the nearness of all the motors to the central plane of the fuselage, the plane would not be materially thrown off its balance by such failure.

It will further be seen that the mounting of the motors within the fuselage has made it possible to mount them more directly upon the strong frame of which the fuselage is constructed, and to thereby eliminate the necessity of heavy framework for supporting them outside of the fuselage.

It is also apparent that by placing the motors within the fuselage the air resistance caused by the motors and by any framework provided for their support has been substantially eliminated.

Also, placing the motors within the fuselage has allowed the positioning of the propellers of the airplane so that the line of thrust due to the action of any single propeller is not far removed from the center line of the airplane.

It will also be appreciated that there has been provided an arrangement of two pairs of motors within an airplane fuselage in such a manner as to concentrate the entire power supply of the airplane within a small area adjacent the mid-portion of the airplane.

It will be appreciated that while the invention has been shown as applied to an airplane of the monoplane type, it might as well be incorporated in an airplane of any other type commonly in use.

It will further be appreciated as aforementioned that various modifications and alterations may be made in the arrangement herein described without exceeding the scope of the invention as defined by the appended claims, it being distinctly understood that the prior art and the claims herein included alone are to be definitive of the invention.

I claim:

1. In an airplane having a fuselage, a plurality of pairs of engines within the fuselage adapted to drive a plurality of pairs of tractor and pusher propellers, the engines of each pair being arranged one above the other.

2. In an airplane having a fuselage, a plurality of pairs of engines within the fuselage adapted to drive a plurality of series of tractor and pusher propellers, the engines of each pair being arranged one above the other.

3. In an airplane having a fuselage, a plurality of pairs of engines within the fuselage adapted to drive a plurality of series of tractor and pusher propellers, the engines of each pair being arranged one above the other, and the respective pairs of engines occupying similar positions on each side of the central plane of the fuselage.

4. In an airplane having a fuselage, a plurality of pairs of water-cooled engines within the fuselage, adapted to drive a plurality of pairs of tractor and pusher propellers, the engines of each pair being arranged one above the other.

In testimony whereof I affix my signature.

GIUSEPPE M. BELLANCA.